(12) United States Patent
Park (10) Patent No.: US 10,030,281 B2
(45) Date of Patent: Jul. 24, 2018

(54) HIGH TOUGHNESS HEAT-TREATED STEEL PIPE HAVING THREE-LAYER STRUCTURE AND MANUFACTURING METHOD THEREOF

(71) Applicant: Hyundai Motor Company, Seoul (KR)

(72) Inventor: Sang-Cheon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 47 days.

(21) Appl. No.: 15/250,274

(22) Filed: Aug. 29, 2016

(65) Prior Publication Data

US 2017/0306433 A1   Oct. 26, 2017

(30) Foreign Application Priority Data

Apr. 25, 2016   (KR) .......................... 10-2016-0050420

(51) Int. Cl.
| | |
|---|---|
| *B60J 5/00* | (2006.01) |
| *C21D 9/08* | (2006.01) |
| *C21D 1/42* | (2006.01) |
| *C21D 1/667* | (2006.01) |
| *B60J 5/04* | (2006.01) |
| *B62D 29/00* | (2006.01) |

(52) U.S. Cl.
CPC ............ *C21D 9/085* (2013.01); *B60J 5/0422* (2013.01); *B62D 29/007* (2013.01); *C21D 1/42* (2013.01); *C21D 1/667* (2013.01); *C21D 2211/002* (2013.01); *C21D 2211/008* (2013.01)

(58) Field of Classification Search
CPC .......... C21D 9/085; C21D 1/42; C21D 1/667; C21D 2211/002; C21D 2211/008; B60J 5/0422; B62D 29/007
See application file for complete search history.

(56) References Cited

U.S. PATENT DOCUMENTS

| | | | | |
|---|---|---|---|---|
| 9,834,832 | B2 * | 12/2017 | Branagan | ................ C22C 38/58 |
| 2014/0102603 | A1 * | 4/2014 | Han | ......................... C21D 9/04 |
| | | | | 148/581 |
| 2014/0102613 | A1 * | 4/2014 | Huotari | ................ B32B 37/142 |
| | | | | 156/60 |
| 2014/0137992 | A1 * | 5/2014 | Ishiguro | ................ C21D 9/085 |
| | | | | 148/570 |

FOREIGN PATENT DOCUMENTS

| | | |
|---|---|---|
| JP | S62-270725 A | 11/1987 |
| JP | 7-268546 | 10/1995 |
| JP | 2005-350688 A | 12/2005 |
| JP | 2012-021214 A | 2/2012 |
| KR | 10-2015-0074985 | 7/2015 |

* cited by examiner

*Primary Examiner* — Lori L Lyjak
(74) *Attorney, Agent, or Firm* — Mintz Levin Cohn Ferris Glovsky and Popeo, P.C.; Peter F. Corless (57) ABSTRACT

Disclosed are a steel pipe having a three-layer structure and a manufacturing method thereof. The steel pipe includes a three-layer structure of bainite and martensite, which are formed by high-frequency induction heating thereby improving toughness to enhance crash performance of a vehicle. The steel pipe includes a bainite structure layer, a bainite and martensite dual-phase structure layer, and a martensite structure layer.

14 Claims, 6 Drawing Sheets

HIGH TOUGHNESS HEAT-TREATED STEEL PIPE HAVING THREE-LAYER STRUCTURE AND MANUFACTURING METHOD THEREOF

CROSS-REFERENCE TO RELATED APPLICATION

This application claims the priority benefit of Korean Patent Application No. 10-2016-0050420, filed on Apr. 25, 2016 in the Korean Intellectual Property Office, the disclosure of which is incorporated herein by reference.

TECHNICAL FIELD

The present invention relates to a steel pipe having a three-layer structure and a manufacturing method thereof comprising heat treatment. The steel pipe may have a three-layer structure and be manufactured by high-frequency induction heating such that the three-layer structure including bainite and martensite may be formed so as to improve toughness to enhance crash performance when used in a vehicle.

BACKGROUND OF THE INVENTION

Recently, as greenhouse gases have emerged as a serious problem all over the world, vehicle exhaust gas regulations have been enforced. Therefore, the most vehicle industry has been trying on reducing vehicle weight to meet international environmental regulations and to improve fuel efficiency. Thereby, vehicle manufacturers have been developing technologies to reduce the weight of a vehicle frame forming the majority of a vehicle weight.

A vehicle frame includes a Body In White (BIW) corresponding to a vehicle body skeleton and operating parts, such as doors, a hood, a trunk, and the like, and forms the majority of the total vehicle weight. Therefore, in the vehicle industry, vehicle weight reduction effects may be greatly increased using light materials for vehicle frames.

Further, the vehicle frame is an important part having a decisive effect on vehicle performance, such as vehicle stiffness, collision and driving safety, and the like. Therefore, it may be understood that strength enhancement together with weight reduction of the vehicle frame are necessary technologies. For the reasons of coexistence of safety and weight reduction of a vehicle, a high-strength steel pipe has been used as some structural members.

For instance, a steel pipe may be installed within a vehicle door so as to minimize damage to a vehicle frame and to protect passengers when vehicle side collision occurs. Such a steel pipe is referred to as a door impact beam and the door impact beam has been formed of high-strength steel to achieve strength enhancement and weight reduction of the vehicle frame. Further, greater strength of the steel pipe has been acquired using structure control through alloy design and heat treatment of steel during manufacture of the steel pipe.

A conventional high-strength steel pipe has been manufactured through a quenching process by direct injection of cooling water, immediately after heating to a temperature of 910° C. or greater through high-frequency induction heating. By such a process, the conventional steel pipe may be transformed from a ferrite and martensite structure of a strength of 500 to 600 MPa to a martensite single-phase structure of a strength of 1500 to 2000 MPa after quenching. Such a martensite single-phase structure may have high brittleness. Therefore, when a steel pipe is formed of such a structure, brittle fracture may occur in an early stage of collision of the vehicle and thus safety of the vehicle and driver's safety may not be sufficiently acquired. In this case, the steel pipe may not sufficiently serve as a door impact beam formed to minimize damage to a vehicle frame and to protect passengers.

In order to solve the above-described conventional problems, a tempering process in which reheating to a temperature of about 200° C. has been carried out after first heat treatment so as to reduce brittleness is added. However, because manufacturing costs may increase due to construction of additional equipment for the tempering process and increase in process time, the tempering process may not be applied to manufacture of a steel pipe. Therefore, in order to solve these problems, a steel pipe with improved toughness and high strength, to have improved crash performance, has been demanded.

Accordingly, the present invention addresses the above mentioned technical difficulties thereby improving toughness of the steel pipe used as a door impact beam of a vehicle and improving impact absorption performance.

SUMMARY OF THE INVENTION

In preferred aspects, the present invention provides a steel pipe, which may have substantially improved toughness and strength of a material to prevent the steel pipe from fracturing during deformation in collision, and a manufacturing method thereof.

Further, the present invention provides a door impact beam using the steel pipe with improved toughness and a manufacturing method thereof to achieve increase in durability and weight reduction of a vehicle, thereby increasing fuel efficiency and preventing environmental pollution.

The present invention is not particularly limited to those mentioned above, and other aspects may be clearly understood by those skilled in the art from the description given below.

In one aspect of the present invention, the present invention provides a steel pipe including a bainite structure layer, a bainite and martensite dual-phase structure layer, and a martensite structure layer. The steel pipe of the invention may obtain high toughness through heat treating, as such, unless otherwise indicated herein, the steel pipe can also be referred to as a high toughness heat-treated steel pipe in this disclosure.

The term "bainite" as used herein refers to plate-like or sheet like microstructure of components (phase morphology) that may be spontaneously formed in an alloy steel at a predetermined temperature range. For example, the bainite of the steel according to an exemplary embodiment of the present invention may be formed at a temperature of about 400 to 650° C. The term "martensite" as used herein refers to a crystalline form or grain form of alloy components such as iron, upon cooling during cooling or quenching process. For example, the martensite of the steel according to an exemplary embodiment of the present invention may be formed at a temperature of about 0 to 20° C.

In one preferred aspect, the bainite and martensite dual-phase structure layer may be formed on the martensite structure layer, and the bainite structure layer may be formed on the bainite and martensite dual-phase structure layer.

In one preferred aspect, the bainite structure layer may be present in about 5 10% of the total thickness of the steel pipe.

In one preferred aspect, the bainite and martensite dual-phase structure layer may be present in about 10 to 15% of the total thickness of the steel pipe.

In one preferred aspect, the martensite structure layer may be in present in about 80 to 85% of the total thickness of the steel pipe.

In one preferred aspect, the bainite structure layer may be in present in about 5 to 10% of the total thickness of the steel pipe, the bainite-martensite dual-phase structure layer may be in present in about 10 to 15% of the total thickness of the steel pipe, and the martensite structure layer may be in present in about 80 to 85% of the total thickness of the steel pipe.

In another aspect of the present invention, provided a method of manufacturing a steel pipe and the method may include: primary induction heating to the steel pipe, and secondary induction heating to heat the outer diameter part of the steel pipe and, simultaneously, cooling the inner diameter part of the steel pipe by cooling water. In one preferred aspect, the primary induction heating may be performed and the secondary induction heating may be performed.

The term "induction heating" as used herein refers to a heating method using electromagnetic induction as alternating an electric current at high-frequency through electromagnets.

In one preferred aspect, the secondary induction heating, the outer diameter part of the steel pipe may be heated to a temperature of about 400 to 650° C.

In one preferred aspect, in the secondary induction heating, the outer diameter part of the steel pipe may be heated for about 20 to 40 seconds.

In the present invention, in the cooling of the inner diameter part of the steel pipe, the temperature of cooling water may be about 0 to 20° C.

In the present invention, in the cooling of the inner diameter part of the steel pipe, cooling water may be injected at a pressure of about 1 bar.

In the present invention, in the primary induction heating, the steel pipe may be heated to a temperature of about 860 to 960° C.

Further provided is a vehicle that may comprise the steel pipe as described herein. For example, the vehicle may comprise the steel pipe used in a door impact beam.

Other aspects of the present invention are disclosed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, the present invention will be described in detail with reference to the accompanying drawings to allow those skilled in the art to easily practice the present invention. The terms or words used in the specification and claims of the present invention are not interpreted using typical or dictionary limited meanings, and are constructed as meanings and concepts conforming to the technical sprit of the present invention based on the principle that the inventors can appropriately define the concepts of the terms to explain the present invention in the best manner Accordingly, it is to be understood that the detailed description, which will be disclosed along with the accompanying drawings, is intended to describe the exemplary embodiments of the present invention and is not intended to represent all technical ideas of the present invention. Therefore, it should be understood that various equivalents and modifications can exist which can replace the embodiments described at the time of application.

The present invention will be described in detail. The present invention relates to a high toughness heat-treated steel pipe having a three-layer structure and a manufacturing method thereof. In one aspect of the present invention, the high toughness heat-treated steel pipe may include a three-layer structure.

Figure 1:
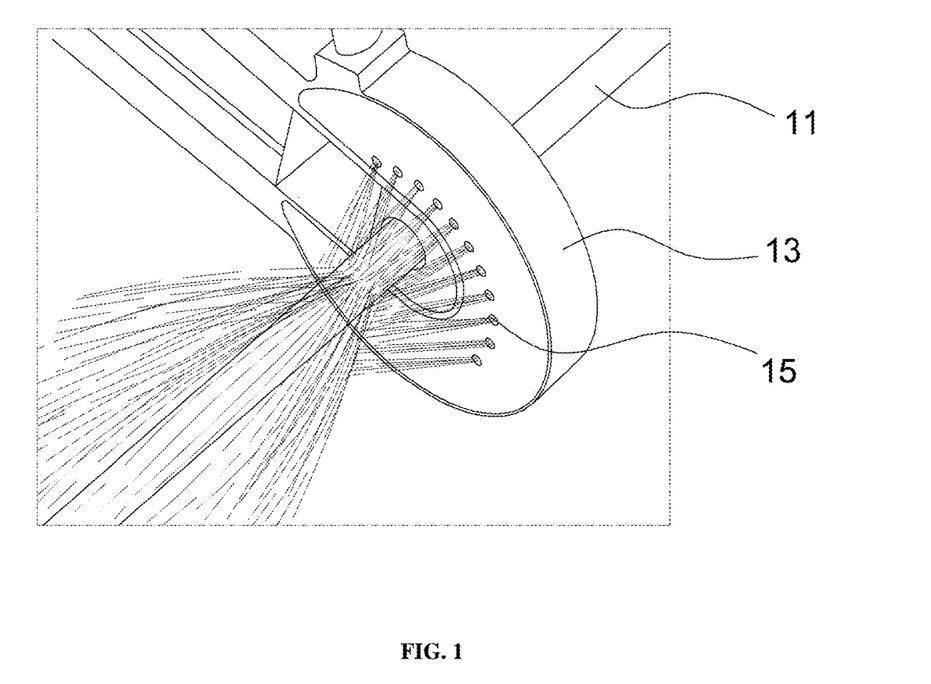
FIG. 1 illustrates a conventional high-frequency induction heating device and a conventional rapid quenching device in the related art.

FIG. 1 illustrates configurations of a conventional high-frequency induction heating device and a conventional rapid quenching device. As exemplarily shown in FIG. 1, a conventional steel pipe 11, a conventional high-frequency induction heating device 13 and a conventional rapid quenching device 15 by direct injection of cooling water are provided.

The conventional steel pipe 11 has been manufactured through a rapid quenching process using the rapid quenching device 15 by direct injection of cooling water immediately after heating to a temperature of about 910° C. or greater using the high-frequency induction heating device 13. By such a process, the steel pipe 11 is transformed from a ferrite and martensite structure of a strength of about 500 to 600 MPa to a martensite single-phase structure of a strength of about 1500 to 2000 MPa after quenching. Such a martensite single-phase structure may have high brittleness. Therefore, when the steel pipe 11 is formed of such a structure, brittle fracture may occur in an early stage of collision of a vehicle and thus safety of the vehicle and driver's safety may not be sufficiently acquired. As such, the steel pipe 11 may not sufficiently serve as a door impact beam formed to minimize damage to a vehicle frame and to protect passengers.

In order to solve the above-described problems, a tempering process of reheating the steel to a temperature of about 200° C. may be carried out after first heat treatment thereby reducing brittleness. However, since, in this case, manufacturing costs may be increased due to construction of additional equipment for the tempering process and increase in process time, the tempering process may not be applied to manufacture of a steel pipe. Therefore, in order to solve these problems, a steel pipe with improved toughness and high strength, to have improved crash performance, is required.

Accordingly, the present invention provides a steel pipe with improved toughness and impact absorption performance, which can be used as a door impact beam of a vehicle.

Figure 2:
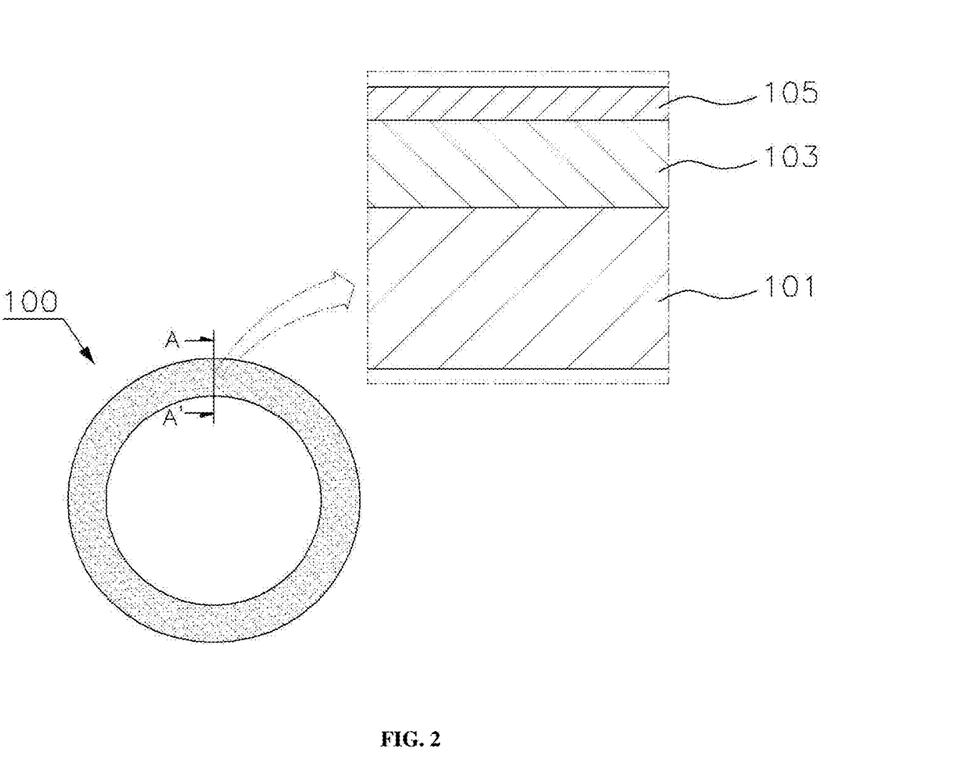
FIG. 2 illustrates an exemplary steel pipe and a cross-section thereof according to an exemplary embodiment of the present invention.

FIG. 2 illustrates an exemplary steel pipe and a cross-section thereof in accordance with an exemplary embodiment of the present invention.

As shown in FIG. 2, an exemplary steel pipe 100 may have a three-layer structure including a bainite structure layer 105, a bainite-martensite dual-phase structure layer 103, and a martensite structure layer 101.

In general, a bainite structure may have less strength than a martensite structure by about 30 to 40% but may have greater tensile properties and toughness, thus being advantageous in collision. However, when the entirety of a steel pipe is heat-treated so as to have a bainite structure, the steel pipe may have improved toughness but reduced strength, as compared to conventional steel pipes.

Accordingly, the steel pipe 100 of the present invention may include a three-layer structure, which may include the bainite structure layer 105 present in about 5 to 10% of the total thickness of the steel pipe 100, the bainite-martensite dual-phase structure layer 103 present in about 10 to 15% of the total thickness of the steel pipe 100, and the martensite structure layer 101 present in about 80 to 85% of the total thickness of the steel pipe 100.

In the steel pipe 100 of the present invention, the bainite and martensite structure layers may be formed in the thickness direction of the steel pipe 100. For this purpose, the steel pipe 100 may be manufactured by primary high-frequency induction heating, and then simultaneously secondary high-frequency induction heating of the outer diameter part of the steel pipe 100 and cooling of the inner diameter part of the steel pipe 100 by cooling water.

Figure 3:
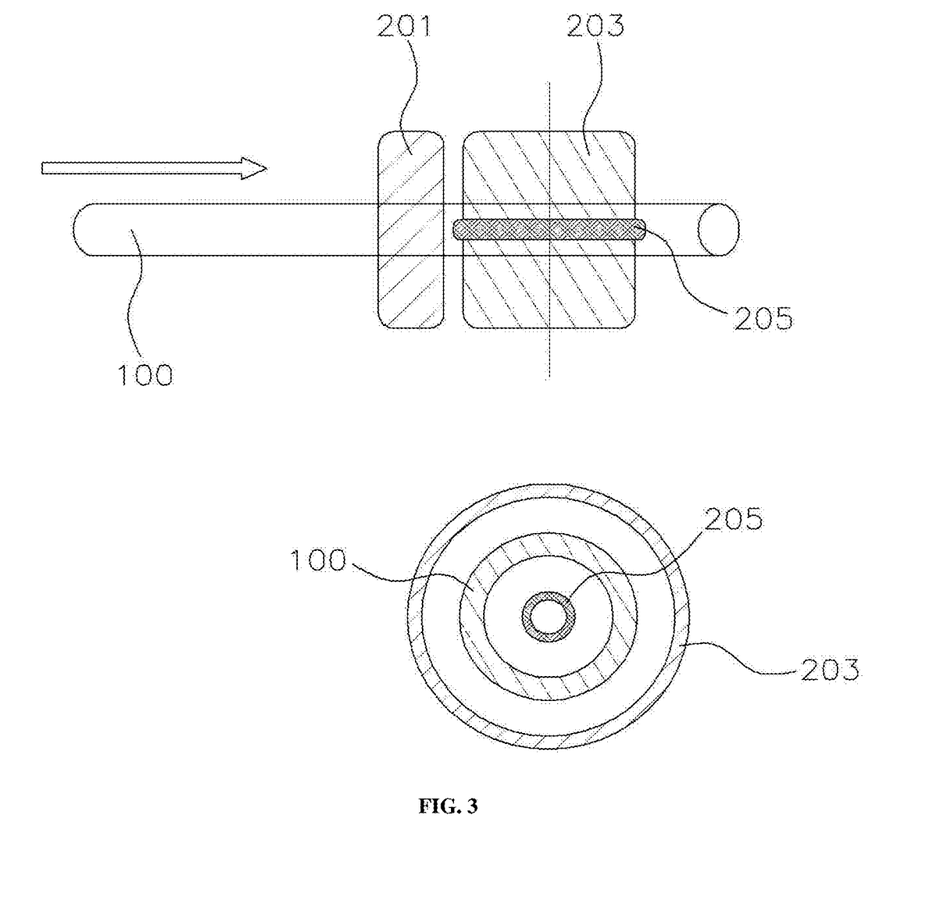
FIG. 3 illustrates an exemplary primary induction heating device, an exemplary secondary induction heating device and an exemplary cooling device for manufacturing an exemplary steel pipe according to an exemplary embodiment of the present invention.

FIG. 3 shows an exemplary primary high-frequency induction heating device, an exemplary secondary high-frequency induction heating device and an exemplary cooling device for manufacturing an exemplary steel pipe in accordance with an exemplary embodiment of the present invention. FIG. 3 shows the primary high-frequency induction heating device 201, the secondary high-frequency induction heating device 203 and the cooling device 205 for manufacturing the high toughness heat-treated steel pipe 100.

The primary high-frequency induction heating device 201 may heat the high toughness heat-treated steel pipe 100 to a temperature of about 860 to 960° C. through high-frequency induction heating, in the same manner as a conventional heat treatment process. When the high toughness heat-treated steel pipe 100 passes through the primary high-frequency induction heating device 201, the outer diameter part of the high toughness heat-treated steel pipe 100 may pass through the secondary high-frequency induction heating device 203 which may heat the high toughness heat-treated steel pipe 10 to a temperature of about 400 to 650° C. and, simultaneously, the inner diameter part of the high toughness heat-treated steel pipe 100 may pass through the cooling device 205 which may cool the high toughness heat-treated steel pipe 10 using cooling water.

In particular, the high toughness heat-treated steel pipe 100 may have the cross-section of which has a layered structure including a high-toughness structure and a high-strength structure, as shown in FIG. 2. For example, the bainite structure 105 may be formed at the outer diameter part of the high toughness heat-treated steel pipe 100 by maintaining a high temperature of about 400 to 650° C. and the martensite structure 101 may be formed at the inner diameter part of the high toughness heat-treated steel pipe 100 by cooling using cooling water.

Accordingly, the high toughness heat-treated steel pipe 100 according to the present invention may have tensile strength similar to the conventional martensite steel and less brittleness. Particularly, when a door impact beam is formed of the high toughness heat-treated steel pipe 100 having such a layered structure and the steel pipe 100 is broken by vehicle collision, tensile stress may be applied to the outer diameter part of the steel pipe 100 and, thus, generation of fracture may be effectively prevented.

When the second heating and the cooling are not simultaneously performed or only cooling at a specific temperature after heating is performed as in the conventional method, the above-described layered structure may not be acquired. Further, when a steel pipe in which a martensite structure is nonuniformly mixed with a bainite structure is manufactured as the conventional method, desired tensile strength may be not acquired.

When a martensite structure is slightly mixed with a bainite structure, tensile strength of about 1000 to 1300 MPa can be typically obtained. Further, in order to increase tensile strength, a carbon content may be increased or a martensite rate may be increased, which may result in increasing brittleness and facture in collision of a vehicle.

The following Table 1 shows conditions of secondary high-frequency induction heating and cooling and test results from the thus manufactured steel pipes.

TABLE 1

| | Secondary high-frequency induction heating | | Temp. of cooling water | Steel pipe after secondary high-frequency induction heating and cooling | | | |
|---|---|---|---|---|---|---|---|
| Division | Temp. (° C.) | Time (sec.) | | Thickness of bainite structure layer (%) | Tensile strength (MPa) | Elongation (%) | High speed collision test |
| Test example | 600 | 30 | 18 | 7 | 1550 | 10 | No fracture |
| Comparative example 1 | Non-applied | Non-applied | 18 | 0 | 1650 | 8 | Fracture |
| Comparative example 2 | 500 | 30 | 18 | 3 | 1640 | 8 | Fracture |
| Comparative example 3 | 600 | 10 | 18 | 1 | 1660 | 8 | Fracture |
| Comparative example 4 | 750 | 30 | 18 | 15 | 1450 | 10 | No fracture |
| Comparative example 5 | 600 | 30 | 25 | 20 | 1400 | 6 | No fracture |

As shown in Table 1, various control condition factors, total of three factors, i.e., a heating temperature and a heating time in secondary high-frequency induction heating after primary high-frequency induction heating, and a temperature of cooling water in cooling, were used. Accordingly, due to the microstructures formed therein, the high toughness heat-treated steel pipes 100, as being used in door impact beams, may have substantially improved tensile properties shown from high-speed collision test results. The high-speed collision test results in Table 1 could indicate whether or not the steel pipes 100 fractured under the condition of a speed of 13 km/h.

Thus, as shown in Table 1, the heating temperature and heating time in secondary high-frequency induction heating may directly influence the bainite structure layer 105 formed at the outer diameter part of the steel pipe 100, and the temperature of cooling water in the cooling device 205 may contribute to formation of the martensite structure layer 101 and the bainite and martensite dual-phase structure layer 103 at the inner diameter part of the steel pipe 100.

The above-described conditions in secondary high-frequency induction heating may be set by adjusting the length of the secondary high-frequency induction heating device 203, through which the steel pipe 100 passes, and the transfer speed of the steel pipe 100.

The optimum heating temperature in the secondary high-frequency induction heating suitably may be about 580 to 650° C. which may be greater than an isothermal cooling temperature of about 350 to 550° C. to form the bainite structure layer 105. When the heating temperature in secondary high-frequency induction heating is less than about 580° C. as in Comparative Example 2 of Table 1, the actual temperature of the outer diameter part of the steel pipe 100 may be partially decreased to a temperature of about 350° C. or less due to effects of cooling water injected onto the inner diameter part of the steel pipe 100 and the bainite structure layer 105 having a target thickness may not be formed. On the other hand, when the heating temperature in secondary high-frequency induction heating is greater than about 650° C. as in Comparative Example 4 of Table 1, the bainite structure layer 105 having a greater thickness than the target thickness may be formed and thus strength of the steel pipe 100 may be reduced.

Further, when the heating time in secondary high-frequency induction heating is less than about 20 seconds as in Comparative Example 3, the bainite structure layer 105 may not be sufficiently formed, the overall steel pipe 100 may be transformed to a martensite single phase structure due to cooling effects of cooling water and thus brittleness may be increased. As consequence, fracture may occur. On the other hand, when the heating time in secondary high-frequency induction heating is greater than about 40 seconds, the bainite structure layer 105 may be excessively formed and strength of the overall steel pipe 100 may be reduced. Therefore, in the present invention, the optimum heating time to manufacture a high-toughness and high-strength steel pipe may be about 20 to 40 seconds.

Further, the temperature of cooling water in cooling to form a fine and dense martensite structure may be about 0 to 20° C. When the temperature of cooling water is greater than about 20° C., the martensite structure may be coarsened and the bainite structure maybe excessively formed and, thus, strength of the steel pipe may be greatly reduced, as compared to test example. In addition, as shown in Comparative Example 5 in Table 1, the elongation rate may be reduced due to effects of the coarsened martensite structure. Further, a pressure for injecting the cooling water may be about 1 bar.

When the secondary high-frequency induction heating and cooling are not simultaneously performed as in the present invention but only cooling after primary high-frequency induction heating is performed as in the conventional method, no bainite structure may be formed, as shown from Comparative Example 1 in Table 1. Further, when the martensite structure is nonuniformly mixed with the bainite structure at the cooling temperatures in the conventional method, desired tensile strength may not be obtained and fracture may occur.

Figure 4:
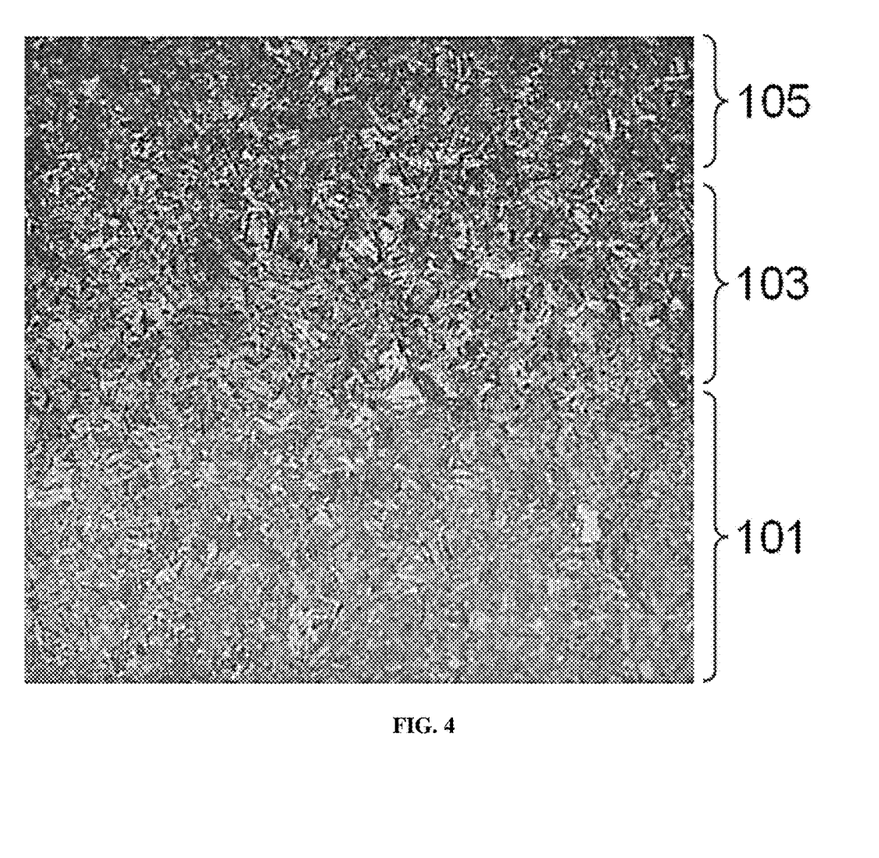
FIG. 4 shows a microscopic photograph of the cross-section of an exemplary steel pipe according to an exemplary embodiment of the present invention.

The cross-sectional structure of an exemplary steel pipe obtained from simultaneous second induction heating and cooling according to an exemplary embodiment is shown in FIG. 4. In FIG. 4, microscopic photograph of the cross section of an exemplary steel pipe with magnification of 200 times is shown.

As shown in FIG. 4, a dense martensite structure layer 101 may be formed at a lower end part of FIG. 4 corresponding to the inner diameter part of the steel pipe 100, and a bainite structure layer 105 and a bainite and martensite dual-phase structure layer 103 may be sequentially formed in the downward direction at an upper end part of FIG. 4 corresponding to the outer diameter part of the steel pipe 100.

A high-speed collision test of a door impact beam manufactured using a high toughness heat-treated steel pipe 100 in accordance with the present invention and a conventional door impact beam were performed using a free fall impact tester.

Figure 5A:
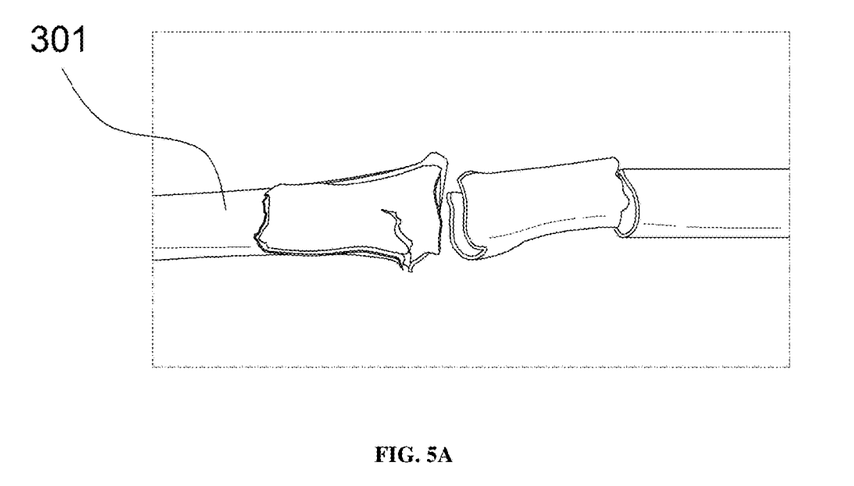
FIG. 5A shows a conventional door impact beam after collision at a speed of 13 km/h.
Figure 5B:
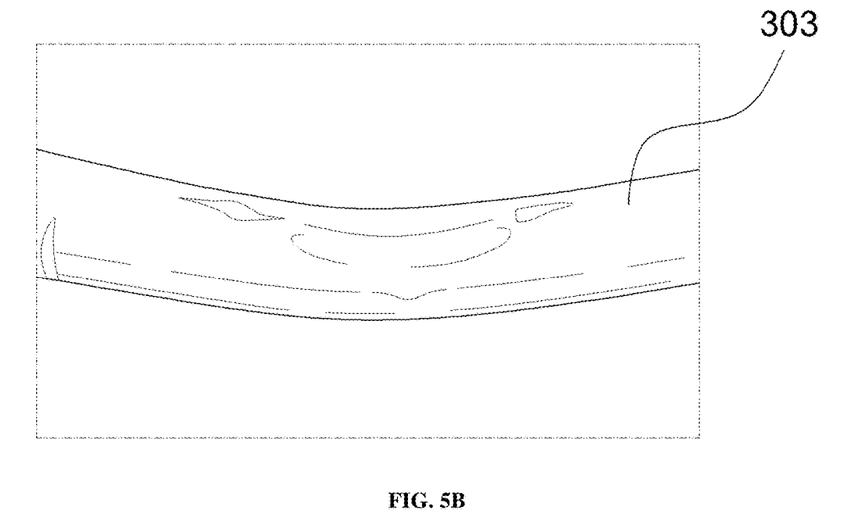
FIG. 5B shows an exemplary door impact beam according to an exemplary embodiment of the present invention after collision at a speed of 13 km/h.

FIGS. 5A and 5B are photographs of results of an exemplary door impact beam and a conventional door impact beam after collision at a speed of 13 km/h.

In this high-speed collision test, an impactor having a cylindrical shape free fell from a designated height to strike the central parts of the door impact beams 301 and 303 and then crash performances and brittlenesses of the door impact beams 301 and 302 were measured. The high-speed collision test was performed while varying the collision speed of the impactor with the door impact beams 301 and 302 at 9 km/hour, 11 km/hour and 13 km/hour.

As results of the test, both door impact beams 301 and 302 were deformed without brittle fracture up to the collision speed of 11 km/h and the maximum loads of the door impact beams 301 and 303 were similar. However, as exemplarily shown in FIGS. 5A and 5B, at the collision speed of 13 km/h, the conventional door impact beam 301 fractured due to brittleness during deformation and the door impact beam 302 according to an exemplary embodiment of the present invention had a favorably deformed state.

Figure 6:
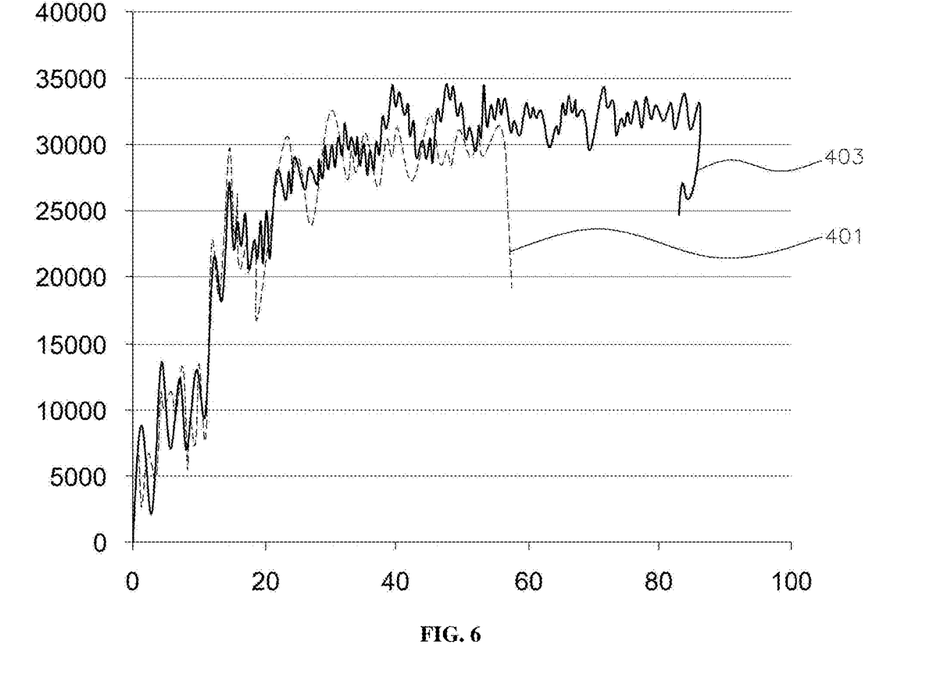
FIG. 6 illustrates collision displacement-load curves of door impact beams at a speed of 13 km/h.

FIG. 6 is a graph illustrating collision displacement-load curves of door impact beams at a speed of 13 km/h. In FIG. 6, a vertical axis represents loads (N) applied to the door impact beams in high-speed collision, and a horizontal axis represents displacements (mm) of the door impact beams thereby.

When a door impact beam fractures during deformation, as described above, the door impact beam may not withstand load at the moment of fracture and thus may not absorb impact energy and lose the function thereof, as shown in FIG. 6.

According to FIG. 6, as indicated from the displacement-load curve 401 of a conventional door impact beam fractured when the displacement of the conventional door impact beam was 55 to 60 mm. Further, as indicated from the displacement-load curve 403 of a door impact beam the present invention, the door impact beam according to an exemplary embodiment of the present invention fractured when the displacement of the door impact beam was about 80 to 90 mm.

Therefore, when an area in the displacement-load curve is referred to as impact absorption energy, it may be understood that the door impact beam 303 according to the present invention may have impact absorption performance increased by about 40% or greater at a speed of 13 km/h, as compared to the conventional door impact beam 301.

Accordingly, a high toughness heat-treated steel pipe and a manufacturing method thereof of the present invention, high strength of a material may be secured and, simultaneously, toughness of the material may be substantially improved, thereby preventing the steel pipe from fracturing during deformation in collision.

Preferably, a door impact beam formed of the steel pipe as described herein may be provided within a vehicle door and thus an inward pushing degree of the central part of the door weak to vehicle side collision may be minimized, and impact energy of side collision may be transferred to a vehicle frame and thus impact transferred to passengers in the vehicle may be minimized Moreover, the vehicle door impact beam manufactured using the high toughness heat-treated steel pipe and the manufacturing method thereof according o various exemplary embodiments of the present invention may increase durability of a vehicle and reduce the weight of the vehicle, thereby increasing fuel efficiency of the vehicle and preventing environmental pollution.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A steel pipe comprising a bainite structure layer formed at an outer diameter part of the pipe, a bainite and martensite dual-phase structure layer, and a martensite structure layer formed at an inner diameter part of the pipe.

2. The steel pipe according to claim 1, wherein the bainite and martensite dual-phase structure layer is formed on the martensite structure layer, and the bainite structure layer is formed on the bainite and martensite dual-phase structure layer.

3. The steel pipe according to claim 1, wherein the bainite structure layer is present in about 5 to 10% of the total thickness of the steel pipe.

4. The steel pipe according to claim 1, wherein the bainite and martensite dual-phase structure layer is present in about 10 to 15% of the total thickness of the steel pipe.

5. The steel pipe according to claim 1, wherein the martensite structure layer is present in about 80 to 85% of the total thickness of the steel pipe.

6. The steel pipe according to claim 2, wherein the bainite structure layer is present in about 5 to 10% of the total thickness of the steel pipe, the bainite-martensite dual-phase structure layer is present in about 10 to 15% of the total thickness of the steel pipe, and the martensite structure layer is present in about 80 to 85% of the total thickness of the steel pipe.

7. A manufacturing method of the steel pipe according to claim 1, the manufacturing method comprising:
   primary induction heating to the steel pipe; and
   secondary induction heating to an outer diameter part of the steel pipe and, simultaneously, cooling an inner diameter part of the steel pipe with cooling water,
   wherein the primary induction heating is performed and the secondary induction heating is performed.

8. The manufacturing method according to claim 7, wherein, in the secondary induction heating, the outer diameter part of the steel pipe is heated to a temperature of about 400 to 650° C.

9. The manufacturing method according to claim 7, wherein, in the secondary induction heating, the outer diameter part of the steel pipe is heated for about 20 to 40 seconds.

10. The manufacturing method according to claim 7, wherein, in the cooling of the inner diameter part of the steel pipe, the temperature of the cooling water is of about 0 to 20° C.

11. The manufacturing method according to claim 7, wherein, in the cooling of the inner diameter part of the steel pipe, the cooling water is injected at a pressure of about 1 bar.

12. The manufacturing method according to claim 7, wherein, in the primary induction heating, the steel pipe is heated to a temperature of about 860 to 960° C.

13. A vehicle part comprising a steel pipe of claim 1.

14. The vehicle part of claim 13 is a door impact beam.

* * * * *